Patented July 14, 1936

2,047,612

UNITED STATES PATENT OFFICE 2,047,612

PREPARATION OF SULPHURIC DERIVATIVES OF HIGHER ALIPHATIC ALCOHOLS

Heinrich Bertsch, Chemnitz, Germany, assignor to American Hyalsol Corporation, Wilmington, Del., a corporation of Delaware No Drawing. Application December 16, 1933, Serial No. 702,789. In Germany August 6, 1930

16 Claims. (Cl. 260—99.12)

This invention relates to processes of producing salts of sulphuric derivatives, i. e., sulphates and sulphonates, of higher aliphatic alcohols having more than eight carbon atoms to the molecule in a substantially pure form, which salts because of their unusual capillary activity find use in many branches of industry and particularly in the textile and leather industries.

As far as I am aware, no one prior to my invention described herein has been commercially successful in preparing such salts in a pure and dry form, particularly when the materials from which the salts are produced are composed of various alcohols derived from a mixture of natural glycerides, such as exist in cocoanut and palm nut oils. The mixture of compounds produced from such oils contains in addition to the higher molecular alcohols having 12 and 14 or more carbon atoms in the chain, constituting the main constituents, also some lower molecular compounds, such for instance, as those containing 10, 8, 6 or less carbon atoms. These low molecular compounds must be removed if a non-hygroscopic dry product is to be obtained.

According to prior processes, the removal of the lower molecular compounds has been attempted by subjecting the raw material to fractional distillation and by subjecting the finished product to recrystallizations, but such methods are so ineffective and wasteful that they are not satisfactory for technical utilization.

An object of the present invention is to produce salts of the sulphuric derivatives of higher aliphatic alcohols in a substantially pure dry form by removal of these lower molecular compounds and other impurities having hygroscopic properties.

Another object is to improve the quality of the above mentioned salt products by removing therefrom unsulphonated alcohols resulting from incomplete sulphonation during their preparation.

A further object is to accomplish in a single operation the removal of hygroscopic impurities, the removal of unsulphonated alcohols and the removal of moisture from salts of the sulphated or sulphonated alcohols derived from natural fatty and waxy materials by for example, either catalytic reduction or saponification and distillation, and thereafter sulphonating and neutralizing.

A still further object is to prepare salts of sulphuric derivatives of alcohols of high molecular weight in a substantially pure dry form without loss of any appreciable portion of said salts by decomposition.

Other objects and advantages will appear from the following description of the broad principles and the specific embodiments of the present invention.

In accordance with a principal embodiment of the present invention, a mixture of alcohols derived from a natural fat or wax is treated with a sulphonating agent under such conditions as will produce sulphates or sulphonates or mixtures of the same as desired. The sulphonated material is neutralized with an alkaline material, such as sodium hydroxide, and most of the water separated as by salting out, settling and decanting, leaving the desired salt product in a pasty mass.

This pasty mass unavoidably contains in addition to the salts of the sulphuric derivatives of the alcohols an appreciable proportion of unsulphonated alcohols and other impurities including compounds which either are already hygroscopic or become so when an attempt is made to dry them. As far as I am aware no one has been able to produce these alcohol sulphate or sulphonate salts free of these alcohols and other impurities on a commercial scale. Attempts to dry the pasty mass by ordinary drying or evaporation of water therefrom results in so much foaming and spattering that the process is uneconomical and the product injured.

In continuing the process, the pasty mass is diluted, if necessary with water or other liquids and then dried while being kept in constant motion in a thin layer by being atomized into a heated chamber wherein the heating is carefully controlled at a temperature at which unsulphonated alcohols, the liquid medium and other impurities are distilled off and the desired alcohol sulphate or sulphonate salts obtained in a substantially pure dry form, or by being quickly dried in a thin layer which prevents foaming and spattering and removes the excess moisture without overheating.

Proper regulation of the temperature is very important, for too high temperatures cause decomposition and loss of the desired salts and too low temperatures do not separate the objectionable constituents. In the treatment of salts produced from some fats or waxes completely satisfactory purity and drying could not be obtained by the process as above described. It was then discovered that success could be obtained in such cases by utilizing with the water employed in obtaining the salts in condition for atomization, a proportion of a more volatile liquid, for example, a low molecular alcohol such as ethyl alcohol, which material aids in distillation, thereby permitting the optimum temperature to be used without necessitating a temperature high enough to injure the product.

The production of the salts in the pure dry form from the above mentioned impure pasty mass is most suitably effected by atomization of the solution or suspension of the mass into a highly heated chamber in such manner that the particles dry without contact with any heated surface, although subjecting the material to heat in a thin layer kept in constant motion as in a drum dryer will secure similar results. In most cases it is not objectionable if the dry particles contact with the hot walls of the drying chamber providing the contact is momentary or not of sufficient duration to cause decomposition. In no case can the wet particles be permitted to remain in contact with the hot surfaces. The temperatures of the air or other gaseous medium surrounding the atomized particles must be sufficiently high to prevent such from occurring.

In the treatment of salts from some sources, it was noticed that in spite of careful selection and regulation of temperature, decomposition of a portion of the salts unavoidably occurred. It was then discovered that the decomposition was occurring after the drying was complete and due to an unnecessarily prolonged period of heating. Immediate and/or rapid chilling or rapid removal of the dried product from the heated zone overcame the difficulty and such procedure I consider as an additional inventive feature of my invention. The immediate withdrawal of the dried product from the heating chamber is often sufficient.

The atomization may be effected in a number of ways as by the use of compressed air or other gaseous medium in well known manner or by directing a stream of the salt solution or suspension upon a rapidly rotating disk. The heating may be carried out by the use of a tank either jacketed for superheated steam or provided with other heating means. Furthermore, the heating may be assisted or altered by the usual expedients, such for instance, as by the use of reduced pressures, or by employing inert gases either in a heated condition or not. The use of heated gases for obtaining the optimum temperature gives very satisfactory results.

If it is desired to produce the alcohol sulphate or sulphonate salts dried product in admixture with other reagents or diluents, such products may be produced by introducing the material in powder form into the aqueous solution or other solution or suspension of the salts before the atomization step is carried out.

Example 1

About 350 kilograms of a mixture of alcohols obtained by the catalytic reduction of cocoanut oil with hydrogen is vacuum distilled under an absolute pressure of about 20 mm. to remove about 42 kilograms of the more volatile substances and to collect a middle fraction of about 300 kilograms, leaving a residue of about 8 kilograms.

The 300 kilogram fraction consists principally of lauryl alcohol together with myristyl, cetyl, and stearyl alcohols in smaller amounts and other alcohols ranging from about 8 to 18 carbon atoms in still smaller quantities. This fraction is charged into an enameled sulphonator vessel and is cooled to about 33° C. while being stirred. There is then slowly added with stirring 160 kilograms of chloro-sulphonic acid, the acid being added at such a rate that the temperature does not go above about 40° C. The acid is added in portions during a period of from one to one and one-half hours, and after all of the acid is introduced the stirring is continued for about five minutes at 38° to 40° C., after which the reaction mass is dropped into a lead-lined iron neutralizing tank into which previously has been charged 310 kilograms of water and 175 kilograms of 35% sodium hydroxide solution. The product is a paste comprising the sodium salts of lauryl sulphate together with other alkyl sulphate esters.

To obtain the product in a purer, drier form, the paste, constituting 19.3 parts, together with 2.3 parts of sodium sulphate, 2.1 parts of water and 1 part of ethyl alcohol is introduced into a lead-lined iron tank fitted with a steam jacket, wherein the mixture is warmed during stirring to a temperature of from 40-50° C. The mixture must be in liquid condition and must test alkaline to phenolphthalein to obtain successful purification. The warmed mixture is then passed through a screen and pumped to the top of a hot air vaporizing chamber from which it flows downwardly through a center conduit onto a disk rotating at about 7000 R. P. M. from which it is sprayed into the heated air. The temperature at the middle of the chamber and at the level of the disk is maintained at about 100° C. The salts of the sulphated alcohol are collected in a substantially pure and dry form.

Example 2

360 kilograms of a mixture of alcohols produced from sperm oil by saponification and distillation, and preferably having an iodine value of 50 are charged into an enameled sulphonator. During stirring and cooling, 360 kilograms of 100% sulphuric acid are slowly added over a period of about 2 hours. The temperature of the reaction mass slowly rises during the run from 40° to 45°-48° C. After all of the acid has been added the stirring is continued for five minutes after which the mass is dropped into a lead-lined iron neutralizer tank fitted with a stirrer and jacket for cooling and heating, said tank already having therein 700 kilograms of water, 850 kilograms of ice and 660 kilograms of 35% sodium hydroxide. When all of the solvent mass has been introduced into the neutralizer, 150 kilograms of sodium sulphate are added. The mixture is stirred for about an hour and then run through the evaporator by pumping the same to the top of the evaporator chamber where it flows down through the center pipe onto a centrifugal disk. The temperature is maintained at about 85° to 90° C. as measured by a thermometer at the level of the disk. The alcohol sulphate salts are obtained in a substantially pure, dry form.

In the foregoing examples other sulphonating agents may be employed including fuming sulphuric acid and chlorosulphonic acid. The examples illustrate the preparation of mixed sodium alkyl sulphates, but other mixed salts, for example, potassium, lithium, ammonium and magnesium salts as well as the salts of less water solubility may be prepared in the same way.

In this manner the salts of the sulphuric acid esters of the higher molecular alcohols may be obtained in a dry and non-hygroscopic form, free of unsulphonated or lower molecular alcohols and in a manner which has not injured the desired salts by overheating or otherwise.

This application is a continuation in part of applicant's copending application Serial No. 548,042, filed June 30, 1931.

The conditions and quantities set out in the above examples may be varied within reasonable limits, and any variation which is within the spirit of the invention is intended to be included within the scope of the appended claims.

I claim:

1. The process of producing salts of sulphuric derivatives of aliphatic alcohols having more than eight carbon atoms in a substantially pure form comprising, treating a mixture of alcohols derived from a natural fatty or waxy material with a sulphonating agent, neutralizing the mixture thereby forming salts of the sulphuric derivatives of such alcohols, atomizing the neutralized mixture in a liquid medium and rapidly heating the same to a temperature at which undesirable impurities and said liquid medium are distilled off and said salts obtained in a substantially pure dry form.

2. The process of producing salts of sulphated aliphatic alcohols having more than eight carbon atoms in a substantially pure form comprising, treating the natural mixture of alcohols derived from cocoanut oil by reduction of the fatty acid constituents therein with a sulphonating agent thereby forming sulphated alcohols, neutralizing the mixture thereby forming salts of the sulphated alcohols, dispersing the neutralized mixture in a liquid medium and rapidly heating the same in a thin layer to a temperature at which lower molecular compounds, said liquid medium and other impurities are distilled off, and salts of the sulphated alcohols having more than eight carbon atoms obtained in a substantially pure dry form.

3. The process as described in claim 2 wherein the temperature to which the dispersed mixture is heated is about 80° to 105° C.

4. The process of producing salts of sulphated aliphatic alcohols having more than eight carbon atoms in a substantially pure form comprising, treating the natural mixture of alcohols derived from palm kernel oil by reduction of the fatty acid constituents therein with a sulphonating agent thereby forming sulphated alcohols, atomizing a neutralized mixture of said sulphated alcohols in a liquid medium and rapidly heating the same to a temperature at which lower molecular compounds, said liquid medium and other impurities are distilled off, and the salts of the sulphated alcohols having more than eight carbon atoms obtained in a substantially pure dry form.

5. The process of producing salts of sulphated aliphatic alcohols having more than eight carbon atoms in a substantially pure form comprising, treating the natural mixture of alcohols derived from sperm oil, with a sulphonating agent thereby forming sulphated alcohols, neutralizing the mixture thereby forming salts of the sulphated alcohols, atomizing the neutralized mixture in a liquid medium and rapidly heating the same to a temperature at which lower molecular compounds, said liquid medium and other impurities are distilled off, and the salts of the sulphated alcohols having more than eight carbon atoms obtained in a substantially pure dry form.

6. The process as described in claim 5 wherein the temperature to which the atomized mixture is heated is about 85° to 90° C.

7. The process of separating hygroscopic impurities from mixtures of salts of sulphuric derivatives of aliphatic alcohols having more than eight carbon atoms containing such impurities comprising forming a fine spray of said mixture dispersed in a liquid medium and heating the finely divided particles to a temperature at which the hygroscopic impurities and the liquid medium are distilled off and said salts obtained in a substantially pure dry form.

8. The process as described in claim 7 wherein the liquid medium is an aqueous liquid medium.

9. The process as described in claim 7 wherein the liquid medium is an aqueous liquid medium containing a quantity of comparatively volatile liquid adapted to assist in the evaporation of constituents to be removed.

10. The process as described in claim 7 wherein the liquid medium is an aqueous liquid medium containing a small proportion of a low molecular aliphatic alcohol.

11. The process of separating salts of sulphuric derivatives of aliphatic alcohols having more than eight carbon atoms in a substantially pure form from mixtures of the same with such alcohols and with hygroscopic impurities, said mixture resulting from incomplete reaction of a mixture of such alcohols with a sulphonating agent comprising atomizing the first mentioned mixture in a liquid medium and heating the same in the presence of a stream of an inert gaseous medium to a temperature at which such alcohols, said liquid medium and hygroscopic impurities are distilled off and said salts remain in a substantially pure dry form.

12. The process of producing salts of sulphuric derivatives of aliphatic alcohols having more than eight carbon atoms in a substantially pure form comprising sulphating an impure mixture of said alcohols, neutralizing with an alkaline material thereby forming salts of the sulphated constituents, atomizing the neutralized material in a liquid medium and rapidly heating the same to a temperature at which the impurities and the liquid medium are distilled off, and rapidly cooling the remaining salts whereby further decomposition of the salts is prevented and the salts obtained in a substantially pure dry form.

13. The process of separating salts of sulphuric derivatives of aliphatic alcohols having more than eight carbon atoms in a substantially pure form from mixtures of the same with such alcohols, the mixture resulting from incomplete reaction with a sulphonating agent comprising atomizing a dispersion of said mixture in a liquid medium and rapidly heating the atomized particles to a temperature at which such alcohols and said liquid medium are distilled off and said salts remain in a dry form.

14. The process of separating salts of sulphuric derivatives of aliphatic alcohols having more than nine carbon atoms from mixtures of the same with impurities remaining from the process by which the salts are produced comprising, atomizing, a liquid dispersion of the mixture in the presence of a stream of a heated inert gaseous medium and heating the same at a temperature and for a period adapted to distill off said impurities and dispersing medium thereby to leave said salts in a substantially pure dry form.

15. The process as described in claim 14 wherein the liquid dispersion of the mixture to be atomized tests alkaline to phenolphthalein.

16. The process of producing salts of sulphuric derivatives of aliphatic alcohols having more than eight carbon atoms in a form substantially free of objectionable impurities which comprises treating a mixture of alcohols derived from a natural fatty or waxy material with a sulphonating agent, neutralizing the mixture, thereby forming salts of the sulphuric derivatives of such alcohols and while the neutralized mixture is dispersed in a liquid medium rapidly heating the same in a thin layer to a temperature at which the lower molecular compounds, said liquid medium and other impurities are distilled off thereby leaving salts of the sulphuric derivatives having more than 8 carbon atoms in a dry form free from objectionable impurities.

HEINRICH BERTSCH.